May 27, 1952      E. J. HUBER      2,598,384
TIP-UP SEAT CONSTRUCTION
Filed May 24, 1947      2 SHEETS—SHEET 1
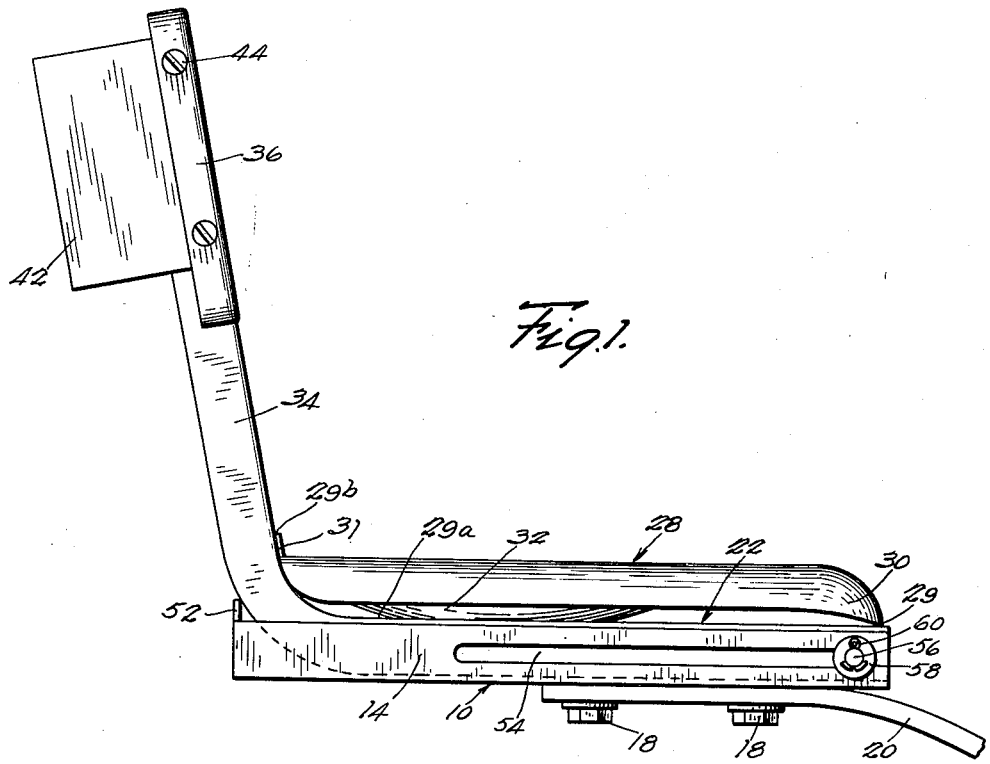
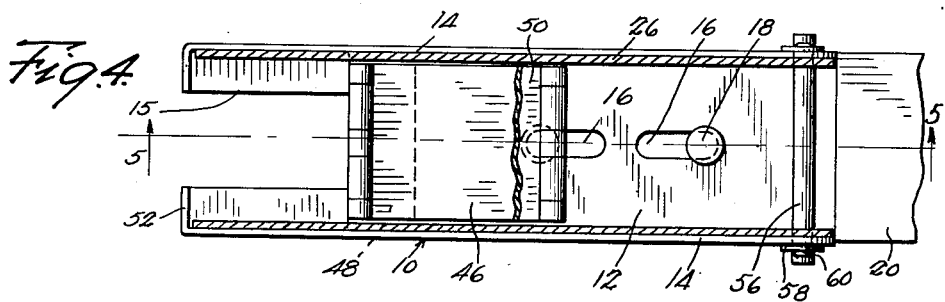
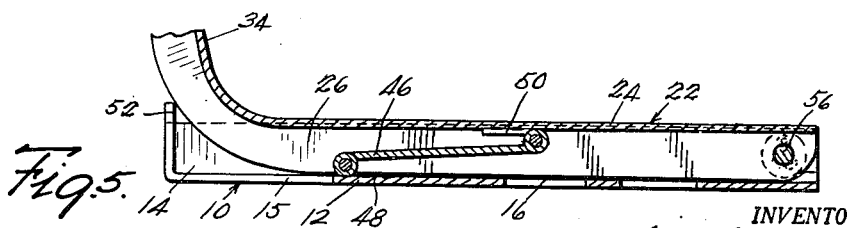
INVENTOR.
Elmer J. Huber.
BY
Thiess, Olson & Mecklenburger.
Attys.

May 27, 1952 E. J. HUBER 2,598,384
TIP-UP SEAT CONSTRUCTION
Filed May 24, 1947 2 SHEETS—SHEET 2
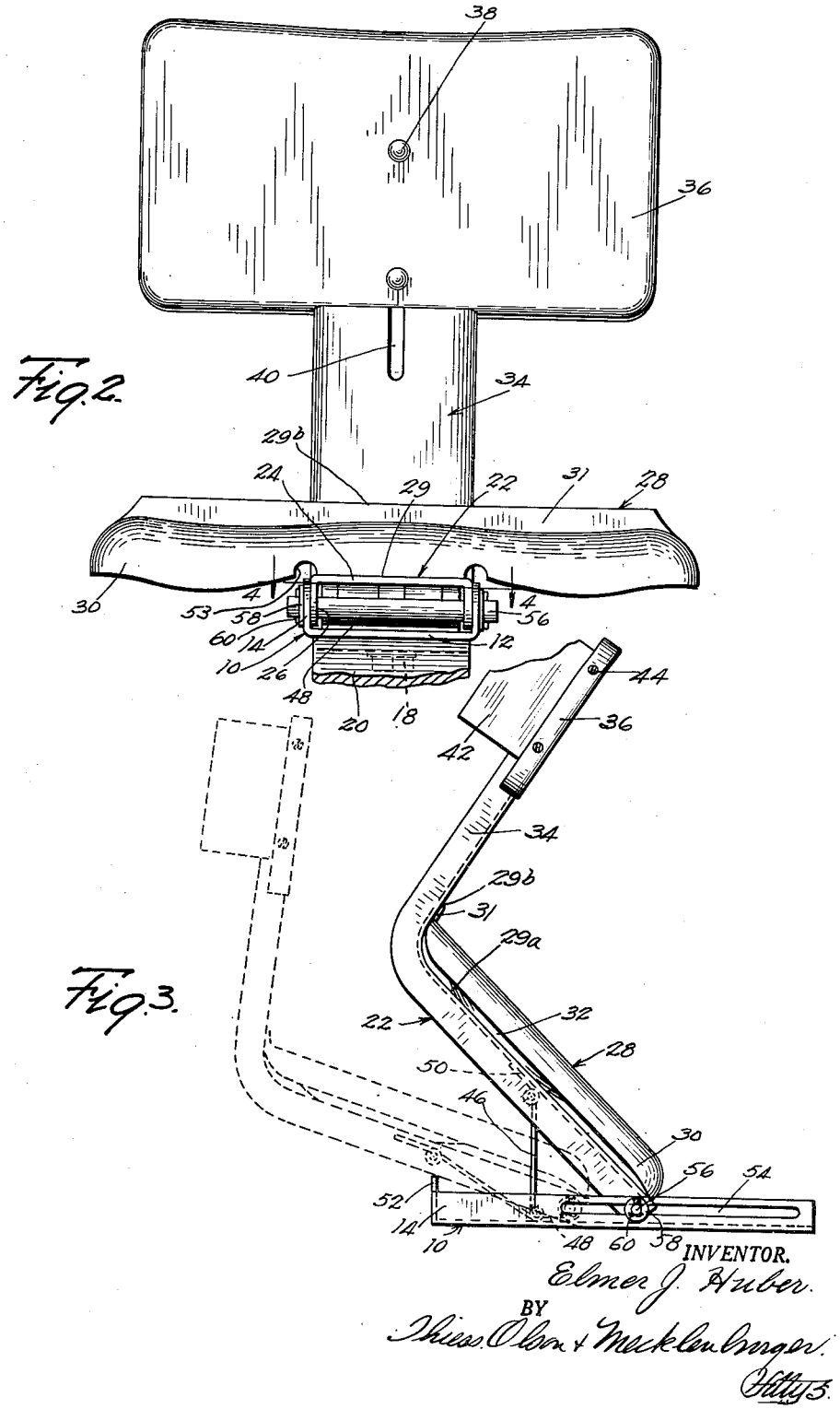

Patented May 27, 1952

2,598,384

UNITED STATES PATENT OFFICE 2,598,384

TIP-UP SEAT CONSTRUCTION

Elmer J. Huber, Joliet, Ill., assignor to F. Willis McGuire and Julius Ruben, Chicago, Ill., as trustees Application May 24, 1947, Serial No. 750,228

5 Claims. (Cl. 155—51)

This invention relates to a seat construction and more particularly to a seat construction suitable for mounting on a tractor or other similar vehicle.

Seats for tractors or other smiliar equipment are ordinarily rigidly secured to an upwardly extending cantilever spring or frame bar of the vehicle, suitable footrests or steps being separately provided upon which the operator may rest his feet. However, during the operation of vehicles of this character, it is often necessary or desirable for the operator to assume a standing position in order to cut down fatigue and afford greater riding comfort. When the seat is rigidly mounted, the sides thereof get in the way of the legs of the operator so that the ready assumption of a standing position is impractical if not impossible.

Accordingly it is one object of this invention to provide a seat construction which will cut down fatigue and afford greater riding comfort for the operator of a tractor or similar equipment.

It is a further object of this invention to provide a seat construction so designed as to give the tractor operator ample support and which is sufficiently rigid to permit the operator to ride side-saddle thereon if he so desires.

A still further object of this invention is the provision of a seat construction in which the seat may be readily moved rearwardly to permit the operator to stand on suitable footrests without straddling the seat with his legs.

A still further object of this invention is the provision of a rearwardly movable seat construction which is securely retained in place when moved to a normal forward position of use and which is also held secure when moved rearwardly to a position of nonuse.

An additional object of this invention is the provision of a movable seat construction in which the seat is positively maintained in alignment with the frame vehicle at all times during movement from the use to the nonuse positions.

In accordance with one embodiment of this invention, a seat construction is provided comprising a seat member, a support for the seat member, and a connector pivotally mounted on the support and pivotally secured to the seat member permitting movement of the seat member with respect to the support from a forward normal position of use to a rearward position of nonuse. The connector preferably comprises a rigid member hinged at one end to the seat member and hinged at the other end to the support member along lines transverse to the support member. A feature of the invention resides in the provision of independent guide means cooperating between the seat member and the support for insuring the alignment thereof during movement. This independent guide means may take the form of a guide track formed in a forward position of the support within which is pivoted a front portion of the seat member.

For a more complete understanding of this invention, reference is now made to the accompanying drawings, in which:

Fig. 1 is a side elevational view of a seat constructed in accordance with one embodiment of this invention and wherein the seat member is shown positioned forwardly in a normal position of use;

Fig. 2 is a front elevational view of the seat construction shown in Fig. 1;

Fig. 3 is a side elevational view of the seat construction showing, in full lines, an intermediate position of the seat member during movement and showing, in dotted lines, the full rear nonuse position thereof;

Fig. 4 is a sectional detail view taken substantially along the line 4—4 of Fig. 2; and Fig. 5 is a sectional elevational view taken along the line 5—5 of Fig. 4.

In the embodiment shown in the drawings there is provided a seat construction comprising a support member 10 in the form of a channel bar having a base section 12 and a pair of longitudinally and upwardly extending flanges 14. The base section 12 has a cut-out portion 15 in the rear end thereof and is provided with a plurality of slots 16 in a central portion through which the support member is adjustably secured by means of bolts 18 to the upper end of a frame bar or cantilever spring 20 of any suitable tractor or other vehicle (not shown). The slots 16 may be spaced to permit of mounting the support member on a large variety of equipment without alteration.

A seat member overlies the support member 10 and includes an inverted channel bar 22 having a base section 24 and dependent flanges 26, which latter are adapted to nest between the flanges 14 and rest upon the base section 12 of the support member 10. A seating section 28 is welded or otherwise secured to the upper surface of the inverted channel bar 22 at points 29, 29a, and 29b and may be formed with a downwardly extending peripheral flange 30 on the sides and front edges, an upwardly extending flange 31 on the rear edge, and other body-conforming portions 32. As shown, the rear end of the inverted channel bar 22 is turned upwardly to form an extension 34 to which a suitable back rest 36 may be adjustably secured by means of bolts 38 extending through a slot or slots 40 formed in the upwardly extending member 34. If desired, a suitable receptacle 42 may be secured to the rear surface of the back rest 36 by means of suitable screws or bolts 44, thus providing a convenient means for holding tools or other articles. The bottom of the receptacle may be provided with suitable apertures (not shown) to prevent the accumulation of rain water within the receptacle.

The seat member is secured to the support 10 by means of a rigid link or connector 46 which is hinged at one end to a plate 48 welded or otherwise secured to the base 12 of the support member 10 and which is hinged at the other end to a plate 50 welded or otherwise secured to the underside of the base 24 of the inverted channel bar 22. It will be noted that by this arrangement the entire seat member, including the inverted channel bar 22, the seating section 28 and the back rest 36 may be thrown back from a normal forward position of use to a rear position of nonuse. In the rear position of nonuse the depending flanges 26 rest on a pair of upwardly extending plates or lugs 52 secured to the flanges 14 and the base section 12, thereby preventing the seat from assuming a horizontal position when moved to the rear nonuse position. It is desirable to have the rear of the seat elevated in this fashion so as to clear various tractor attachments. Also by having the seat tilted forwardly in the nonuse position, the seating section 28 will drain readily in case of rain, and water will not have a tendency to accumulate within the depressions formed by the body-conforming portions 32. It will be noted (Fig. 2) that the peripheral flange 30 adjacent the front end of the seating section 28 is provided with cut-out portions 53 to receive the flanges 14 of the support member 10 during movement of the seat and when the seat is in the rearward position.

In order to assist in the alignment of the seat member with the support at all times during movement from a forward to a rearward position, there is provided a guide track in a forward portion of the support member. This guide track in the embodiment shown takes the form of a pair of parallel longitudinally extending slots 54 formed in the upwardly extending flanges 14. The forward end of the seat member is pivotally mounted within the slots 54 by means of a bolt 56 extending through registering apertures in the forward end of the depending flanges 26 and through the slots 54. The bolt 56 is held in position by suitable washers 58 and cotter keys 60.

It will be apparent from the foregoing description that a simple and convenient seat construction has been provided which may readily be moved back to permit the operator to stand without interference from the main body portion of the seating section. This movement may readily be accomplished by lifting the seat member by the back rest 36 to cause the seat member to pivot about the bolt 56. At the same time the connector 46 pivots at its opposite ends with respect to both the inverted channel bar 22 and the support member 10. Thus as the back rest is pulled up and forward, the connector 46 pivots with respect to the support 10 in a counterclockwise direction, as shown in the drawings, and the bolt 56 rides rearwardly in the longitudinal slots 54 formed in the flanges 14 of the support member.

After the seat construction has been moved so that the connnector 46 has reached substantially a vertical position, rearward pressure on the front portion of the seat member assisted by gravity results in the continued counterclockwise movement of the connector and continued rearward movement of the bolt 56 in the apertures 54 until the seat member finally assumes the rear position of nonuse as shown in dotted lines in Fig. 3. In this rearmost position, the seat member is supported by the flanges 26 resting on the upwardly extending plates or lugs 52 and further by the bolt 56 in the slots 54. It will be noted that the seat member will be retained by gravity in the rearmost position and will not have a tendency to fall forward during the operation of the vehicle because of the fact that it must be lifted to a considerable extent in an upward direction in order to permit the connector member 46 to assume the substantially vertical position which will permit of forward movement. In order to slide the seat member forward from the rearward position, the back is lifted forwardly to pivot the seat member about the sliding bolt 56 until the connector reaches a substantially vertical position, whereafter downward pressure on the back rest, assisted by gravity, causes the forward portion of the seat member further to slide forward in the guide track and the connector to pivot in a clockwise direction until it lies substantially flat, as shown in Fig. 5. When in use, the seat member is held in the forward position by the rigid connector 46 since the seat member cannot slide backward without lifting the seat member, as hereinbefore described.

It will be noted that the connector is positioned in the space between the bases of the channel bars 10 and 22 and that it is concealed from view by the flanges 14 and 26. Also by the close fit of the flanges 26 between the flanges 14, a particularly rigid construction is provided when the seat is in the forward position of use which will permit the operator to ride side-saddle if he so desires.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A seat construction comprising a seat member, a back rest, an inverted channel bar rigidly secured to the underside of said seat member and having an upwardly extending portion supporting said back rest, said inverted channel bar including a base section and depending flanges, a seat member supporting channel bar also including a base section and upwardly extending spaced flanges, one of said channel bars being of greater width than the other so that they fit together in nesting relationship with the side edges of the flanges of one abutting the base section of the other whereby said seat member is held in alignment with said supporting channel bar, a rigid connector hinged at one end to the base section of the inverted channel bar along a line transversely thereof and hinged at the other end to the base member of the seat member supporting channel bar also along a line transversely thereof thereby permitting upward and rearward movement of said seat member and back rest with respect to said seat member supporting channel bar from a normal position of use to a position of nonuse, longitudinally extending parallel guide tracks in a forward portion of the upwardly extending spaced flanges, and means pivotally securing a front portion of said depending flanges within said guide tracks whereby said front portion rides therealong during said movement.

2. The seat construction recited in claim 1 wherein said guide tracks comprise a pair of slots formed in said upwardly extending flanges.

3. The seat construction recited in claim 1 wherein said inverted channel is nested between the upwardly extending flanges of the seat member supporting channel bar, wherein said guide tracks comprise a pair of slots formed in said upwardly extending flanges, and wherein the last mentioned pivoted securing means comprises a member extending transversely through said slots and registering apertures in the front end portions of said depending flanges.

4. A seat construtcion comprising a frame bar having means for securement to a vehicle in a substantially horizontal position, a seat member supported on said frame bar having a central portion overlying said frame bar and movable to a forward position of use and to a rearward position of nonuse, a rigid connector hinged to the underside of said central portion of said seat member at one end and hinged to an upper surface of said frame bar at the other end whereby said central portion describes the arc of a circle when moved to said use and nonuse positions, said connector being hinged to said central portion at a point spaced forwardly of the point at which it is hinged to said frame bar when in said position of use, a guide track in a forward portion of said frame bar, means for pivotally securing a forward portion of said seat member within said guide track whereby said forward portion rides therealong during said movement thus effecting tilting of said seat member upon movement to said position of nonuse, and an upstanding portion adjacent a rearward portion of said frame bar for engagement with said seat member to retain the latter in a tilted position when moved to the nonuse position.

5. A seat construction comprising a frame bar having means for securement to a vehicle in a substantially horizontal position, a seat member supported on said frame bar having a central portion overlying said frame bar and movable to a forward position of use and to a rearward position of nonuse, said seat member having a forward edge portion extending transversely of said frame bar, a rigid connector hinged to the underside of said central portion of said seat member at one end and hinged to an upper surface of said frame bar at the other end whereby said central portion describes the arc of a circle when moved between said use and nonuse positions, said connector being hinged to said central portion at a point forwardly of the point at which it is hinged to said frame bar when in said position of use, a guide track in a forward portion of said frame bar extending longitudinally thereof, and means for pivotally securing a forward portion of said seat member adjacent said forward edge within said guide track and adjacent the upper surface of said frame bar whereby said forward portion rides therealong during said movement thus effecting tilting of said seat member upon movement to said position of nonuse and whereby the forward edge is retained adjacent the upper surface of said frame bar at all times during said movement.

ELMER J. HUBER.

REFERENCES CITED

The following references are of record in the file of this patent:

UNITED STATES PATENTS

| Number | Name | Date |
| --- | --- | --- |
| 488,436 | Kilgore | Dec. 20, 1892 |
| 1,473,945 | Whiting | Nov. 13, 1923 |
| 2,411,125 | Borsheim | Nov. 12, 1946 |

FOREIGN PATENTS

| Number | Country | Date |
| --- | --- | --- |
| 326,835 | Great Britain | Mar. 20, 1930 |
| 504,239 | Great Britain | Apr. 21, 1939 |